Nov. 21, 1961

H. D. FRAZIER

DICE POSITIONER

Filed Feb. 15, 1960

3,009,560

HENRY D. FRAZIER,
INVENTOR.

BY Spensley and Horn

ATTORNEYS.

United States Patent Office 3,009,560
Patented Nov. 21, 1961

3,009,560
DICE POSITIONER

Henry D. Frazier, Los Angeles, Calif., assignor to Pacific Semiconductors, Inc., a corporation of Delaware
Filed Feb. 15, 1960, Ser. No. 8,561
3 Claims. (Cl. 198—30)

This invention relates to a method and apparatus for positioning small bodies at a predetermined location, and more particularly to an improved method and apparatus for positioning small bodies such as semiconductor crystals at a particular location for automatic transport to a subsequent station for carrying out manufacturing steps upon said bodies.

In the manufacture of many devices, particularly small devices such as semiconductor devices where the parts are of a minute size, it is difficult to perform automatic manufacturing operations upon the various parts due to the transport difficulties involved.

That is, for example, in semiconductor diodes and transistors, the heart of the device is a semiconductor crystal which is extremely small. In a typical device the semiconductor crystal body is of the order of .008" to .060" in diameter and in the order of .002" to .040" in thickness. In order to perform automatic manufacturing and assembling operations upon such bodies, it is necessary to provide means for moving the bodies from one manufacturing station or assembly station to the next assembly station. For example, after certain operations have been carried out upon the semiconductor crystal bodies, it is necessary to transport them to a location where electrical conducting leads are attached to the opposite surfaces of the body. In order to perform this operation in an automatic manner, it is necessary to transport the bodies to the particular location at which the electrical conducting leads are to be affixed to the surfaces. Various means are used for transporting such bodies. One of such means being a vacuum pencil of the type known to the art, which is a small instrument which develops a vacuum at the point thereof sufficient to lift and transport one of the semiconductor crystals from one position to a second position. Prior to transport by such an apparatus, however, it is essential that the semiconductor body be located at a station where it will be picked up by the apparatus. In the prior state of the art, no feasible or economical method or apparatus has been known by which the small crystals could be located at the position where the vacuum pencil could automatically act upon them, it having been necessary prior to the present invention to have the vacuum pencil operated by manual means, whereby the operator would orient the crystal, pick it up, and carry it to the next assembly station.

Accordingly, it is an object of the present invention to provide a method and means for positioning small bodies at a predetermined location.

It is another object of the present invention to provide a method and means for positioning small bodies at a predetermined location and in an orientation such that one of a large multiplicity of such bodies is properly positioned and located at a station for subsequent operation thereon.

Yet another object of the present invention is to provide such a method and apparatus for positioning and orienting small bodies, such as semiconductor crystal bodies, in order that they may be automatically intercepted or operated upon for transportation to a second location.

It is a still further object of the present invention to provide an apparatus of the character described which is efficient and automatic in use.

Another object of the present invention is to provide an apparatus of the character described which will receive a large multiplicity of such small bodies in random orientation and automatically move such bodies successively, individually, to a predetermined position at which they are to be intercepted or operated upon.

It is a still further object of the present invention to provide an apparatus of the character described whereby semiconductor crystal bodies can be located in random orientation to separate one body from the large number thereof and move it to a position at which it can be picked up and transported by automatic means to a second position for automatic assembly or other manufacturing process.

Yet another object of the present invention is to provide an apparatus for automatically positioning a semiconductor crystal body at a predetermined position without contamination or undue exposure of the body to contaminating atmospheres or materials.

The novel features which are believed to be characteristic of the present invention, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

The present invention is an apparatus for positioning a single body at a predetermined index point and includes a mask having an opening therethrough, which opening is of a particular configuration convergent to an index point which index point is substantially equal in cross-sectional area to the area of one of the bodies being oriented. Means are provided beneath the mask and parallel thereto which means are moved transversely with respect to the mask in the direction of conveyance of the opening such that a plurality of bodies positioned in the opening are caused to move toward the index point, which index point will admit only a single one of said bodies.

Although not specifically limited thereto, the present invention is particularly adaptable and desirable in connection with the assembly of small bodies such as semiconductor devices.

As is well known in the art, various semiconductor devices such as diodes and transistors contain parts which are of a substantially minute size and which are very difficult to handle in assembly operations. This is particularly true when the assembly operations are sought to be automatized since the small size of the various parts makes the handling operations very difficult. As stated hereinabove, one of the primary difficulties encountered in the handling of such small objects and parts is the problem of transport from one assembly or manufacturing station to another. For example, after the various junction forming and etching operations have been carried out upon the semiconductor crystal body, it is then ready for subsequent assembly operations, such as the attachment of the electrical conductors to opposite surfaces of the semiconductor crystal body. In order to attach the conductors by an automatic assembly apparatus, however, it is necessary to transport the bodies from the location at which they were etched to the position at which the conductors are to be joined thereto by welding, goldbonding or other similar process which may be carried out in automatic machines. Prior to the present invention it has been necessary for an operator to transport the bodies individually and manually by means of tweezers, funnels and the like. Various devices are available which will engage the body and which will transport it automatically from one station to another, but in order to be automatized, the bodies to be moved must be brought to the point at which they can be picked up by the carrying apparatus. The present invention provides such a positioning apparatus.

Figure 1:
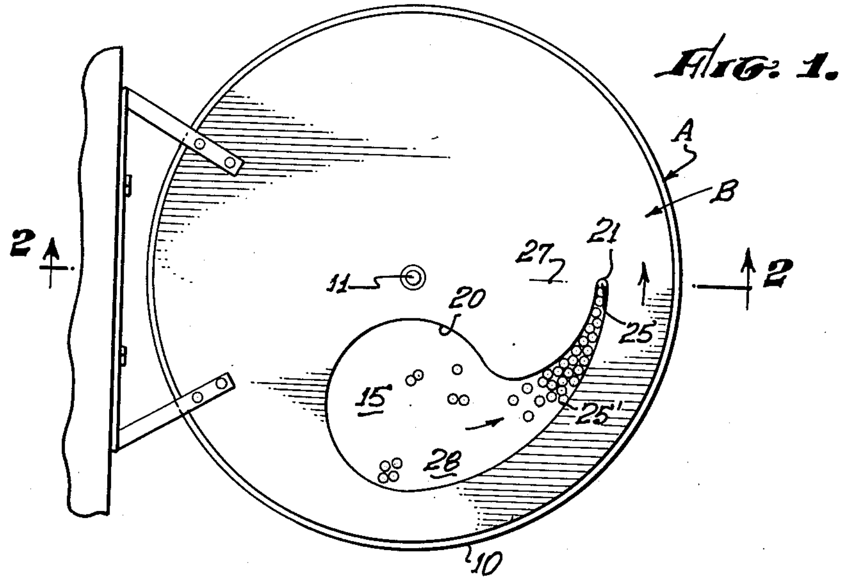
FIGURE 1 is a top plan view of a presently preferred embodiment of the present invention.

Referring now to the drawing, the apparatus of the present invention in its presently preferred form includes a movement assembly for inducing a substantially planar movement to the crystal bodies which movement assembly is designated generally as A in the figures, and a mask assembly B. As shown particularly in FIGURES 1 and 2, the movement inducing assembly A in its presently preferred form includes a rotating table 10 which is mounted about a vertical axis on a shaft 11 for rotation in the horizontal plane. The turn-table may be formed of any suitable material such as aluminum, but the surface thereof must be formed of a material which is non-contaminating to the devices being positioned and which has a proper coefficient of friction as will become more apparent hereinafter. The presently preferred material which is utilized is Teflon, which is a fluorine carbon plastic and is a trade name belonging to the Kellog Company. The turn-table is rotated by suitable means such as a low speed synchronous motor 12 which may be connected directly to the turn-table or connected thereto through suitable gear reduction means to obtain the necessary rate of rotation. In its presently preferred form, the table is rotated at a relatively low rate of speed such as, for example, 1 r.p.m. The motor drive means 12 is in turn positioned upon a stationary surface 14 which may be any suitable stationary foundation.

Positioned above the turn-table 10 and adjacent the upper surface 15 thereof, is the mask portion B of the present invention. The mask is formed of material having sufficient rigidity to maintain a planar configuration in close proximity to the upper surface 15 of the turn-table and preferably in sliding contact therewith. In the presently preferred embodiment, Teflon is again utilized. The mask as shown has a circular planar configuration and is approximately equal in diameter to the diameter of the turn-table. The mask is affixed by suitable means such as the bracket 17 to a stationary mounting support 18 such that it is non-rotatable with respect to the turntable but is in sliding contact with the upper surface thereof. Accordingly, the turn-table will rotate about the mask at the lower surface thereof. In the embodiment shown in the figures, the direction of rotation is counterclockwise as indicated by the arrows, although, of course, the direction of rotation may be reversed and, as may become more apparent hereinafter, means may be utilized which impart a direction of movement which is other than rotational.

There is provided through the mask an opening 20 which is of a particular configuration. This opening extends through the mask such that the upper surface 15 of the turn-table is exposed therethrough. At the forward end 21 of the opening there is provided a portion of particular configuration which will be referred to hereinafter as the index point. This index point is substantially similar in configuration and size to a single one of the bodies being positioned, and is located at the predetermined position to which the body is to be moved. Thus, in the illustrative example, since the bodies being moved are semiconductor crystal bodies of substantially circular cross-section, the index point of the opening is substantially a semicircle having a radius approximately equal but slightly larger than the radius of the body 25. The opening is convergent to the index point in the direction of movement of the surface 15 such that the opening is generally funnel or tear shaped with the smallest width between sides of the opening being at the position furthest along the direction of motion. Thus, the opening includes a large portion into which a large number of the bodies can be placed in random orientation, with the walls of the opening converging to the index point at which only one of the semiconductor crystal bodies 25 can be positioned at a given time. Accordingly, it can be seen that if a large number of crystal bodies are deposited into the receiving portion 28 of the opening which is the large portion, they will be moved by the friction of the turn-table toward the index point since the direction of motion of the turn-table is toward this point. Accordingly, referring particularly to FIGURE 1, it can be seen that as the table rotates, the crystal bodies 25 are continually urged to the index point such that a single one of the crystal bodies 25 will occupy the index at a given time.

Figure 2:
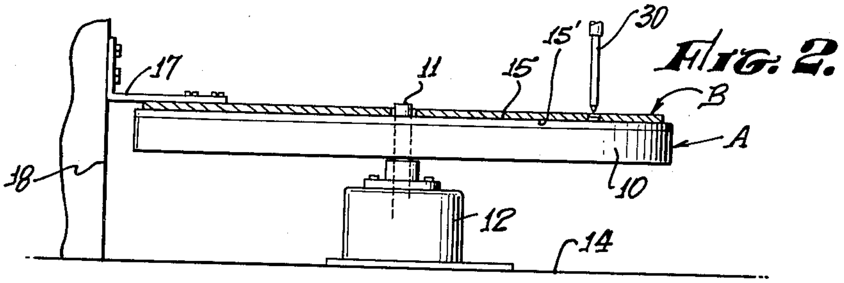
FIGURE 2 is a sectional view in elevation taken along line 2—2 of FIGURE 1.
Figure 3:
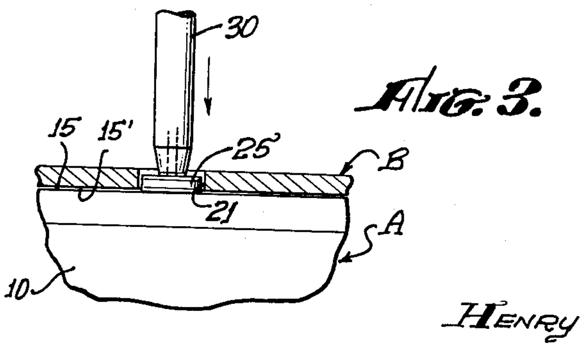
FIGURE 3 is an enlarged view of a single semiconductor body positioned at the index point of the apparatus and with an illustrative transport means in cooperative contact therewith.

Referring now particularly to FIGURES 2 and 3, it can be seen that due to the small size of the bodies being positioned, which are shown greatly enlarged in FIGURE 3, the lower surface 15 of the mask must be in substantially sliding contact with the upper surface 15 of the turn-table in order to prevent any one of the semiconductor crystal bodies 25 from passing between the turn-table and the mask.

Thus, as shown in FIGURE 3, a suitable lifting means such as a vacuum pencil 30 which forms no part of the present invention and which is well-known to the art can be utilized to pick up the crystal body 25 which has been positioned at the index point by the rotation of the turn-table. Since this pickup point is stationary, it is possible to operate the vacuum pencil or other suitable lifting means in an automatic manner since it can always receive one of the semiconductor crystal bodies at the same location.

Thus, the present invention provides a simple and efficient means for positioning small bodies such as semiconductor crystal bodies at a predetermined location, in order that they may be transported from the predetermined position to another position by automatic means.

It will be apparent to those skilled in the art that many modifications may be utilized to perform desired operations at the point of pickup such as using metal plates and a metal pencil to sense the electrical orientation of the crystal in order that automatic machinery can be instructed to drop into a reject bin those that are in an undesirable orientation. Sizing operations could also be performed as, for example, by defining openings through the turn-table sized to permit bodies of less than a minimum to pass therethrough.

What is claimed is:

1. An apparatus for transporting a small body from a plurality of such bodies to a predetermined location comprising: a rotatable table having an upper substantially planar surface, said upper surface being formed of material having a relatively low coefficient of friction with said bodies; means for rotating said table to rotate said upper surface in a substantially horizontal plane; a stationary mask positioned above said table and defining a lower surface, said lower surface being in substantially sliding contact with said upper surface of said table, said mask defining an opening therethrough to said upper surface, said opening being adapted to receive a plurality of said bodies upon said upper surface; an index point defined by said opening, said index point having a configuration adapted to receive and position a single one of said bodies, said opening being convergent to said index point in the direction of movement of said upper surface.

2. An apparatus for transporting a semiconductor body from a plurality of randomly oriented semiconductor bodies to a predetermined location comprising: a rotatable table having an upper substantially planar surface, means for rotating said table to rotate said upper surface in a supstantially horizontal plane; a stationary mask positioned above said table and defining a lower surface, said lower surface being in substantially sliding contact with said upper surface of said table, said mask defining an opening therethrough to said upper surface, said opening being adapted to receive a plurality of said semiconductor bodies upon said upper surface; an index point defined by said opening, said index point having a configuration adapted to receive and position a single one of said semiconductor bodies, said opening being convergent to said index point in the direction of movement of said upper surface.

3. An apparatus for transporting a semiconductor body from a plurality of randomly oriented semiconductor bodies to a predetermined location comprising: a rotatable table having an upper substantially planar surface, means for rotating said table to rotate said upper surface in a substantially horizontal plane; a stationary mask positioned above said table and defining a lower surface, said lower surface being in substantially sliding contact with said upper surface of said table, said mask defining an opening therethrough to said upper surface, said opening being adapted to receive a plurality of said semiconductor bodies upon said upper surface; an index point defined by said opening, said index point having a configuration adapted to receive and position a single one of said semiconductor bodies, said opening being convergent to said index point in the direction of movement of said upper surface, said upper and lower surfaces being formed of a material having a relatively low coefficient of friction with said semiconductor bodies and being noncontaminating with respect thereto.

References Cited in the file of this patent

UNITED STATES PATENTS

| | | |
|---|---|---|
| 2,088,038 | Scott | July 27, 1937 |
| 2,638,201 | Fairest | May 12, 1953 |
| 2,928,521 | Johnson | Mar. 15, 1960 |